United States Patent
Jackson et al.

(10) Patent No.: US 6,662,071 B1
(45) Date of Patent: Dec. 9, 2003

(54) METHOD OF MANUFACTURING PRECISION PARTS WITH NON-PRECISION FIXTURES

(75) Inventors: John Dennis Jackson, Wyoming, OH (US); Dean Michael Robinson, Schenectady, NY (US); Michael Evans Graham, Slingerlands, NY (US); Gregory Alan Mohr, Scotia, NY (US); Olalekan Solomon Odesanya, Schenectady, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/559,305

(22) Filed: Apr. 25, 2000

(51) Int. Cl.⁷ .............................. G06F 19/00
(52) U.S. Cl. ........................ 700/159; 700/194
(58) Field of Search ................ 700/159, 160, 700/182, 186, 192, 193, 194

(56) References Cited

U.S. PATENT DOCUMENTS

| | | | |
|---|---|---|---|
| 3,633,011 A | | 1/1972 | Bederman et al. |
| 5,115,400 A | * | 5/1992 | Watanabe et al. ........... 700/182 |
| 5,208,763 A | * | 5/1993 | Hong et al. .................... 702/95 |
| 5,278,953 A | * | 1/1994 | Saxon et al. ................. 345/839 |
| 5,295,200 A | | 3/1994 | Boyer |
| 5,347,471 A | * | 9/1994 | Simon et al. ................... 702/81 |
| 5,546,328 A | | 8/1996 | Kiridena et al. |
| 5,691,909 A | * | 11/1997 | Frey et al. .................... 700/159 |
| 5,715,167 A | | 2/1998 | Gupta et al. |
| 6,094,793 A | | 8/2000 | Szuba |
| 6,434,441 B1 | * | 8/2002 | Beauchamp et al. .......... 700/98 |
| 6,507,806 B1 | * | 1/2003 | Tandler ......................... 703/1 |

* cited by examiner

*Primary Examiner*—Leo Picard
*Assistant Examiner*—Chad Rapp
(74) *Attorney, Agent, or Firm*—David C. Goldman, Esq.; Beusse, Brownlee, Bowdoin & Wolter, P.A.; Enrique J. Mora, Esq.

(57) ABSTRACT

A method (28) for manufacturing a precision part (18) utilizing a non-precision fixture (10). The non-precision fixture is precisely measured (40) and modeled in a CAD program (42) together with a model of the part (30). The part model is nested (48) into the fixture model, and a transformation matrix describing the movement of a coordinate system of the part during the step of nesting is recorded (50). The transformation matrix may then be used to transform (52) a tool path that had been developed for the originally designed shape of the fixture. Accordingly, imprecision in the location of a part within an imprecisely measured fixture may be accounted for during subsequent manufacturing operations.

11 Claims, 7 Drawing Sheets

METHOD OF MANUFACTURING PRECISION PARTS WITH NON-PRECISION FIXTURES

BACKGROUND OF THE INVENTION

This invention relates generally to the field of manufacturing, and more particularly, to the use of a fixture to secure a part in a machine tool during a manufacturing operation, and specifically to the manufacturing of precision parts with non-precision fixtures.

Machine tools are capable of very precise movements relative to the working surface of the tool. Typical manufacturing operations performed in this manner may include drilling, turning, milling, routing, welding, etc. The accuracy of such a manufacturing operation is limited not by the ability of the machine tool to perform a desired movement, but rather, by the ability of the operator to position the part accurately within the coordinate system of the machine tool. Highly skilled operators using precision measuring instruments are capable of performing machine/part setups for very precise operations. However, the cost of such precision setups is prohibitive for most applications involving high volume operations.

It is known to utilize fixtures to secure a part relative to the working surface of a machine tool during a manufacturing operation. The precision fixture is a mass production solution to the cost of precision setup. Rather than having a skilled machinist precisely position each part to be machined, the use of a precision fixture allows a machinist of lesser ability to rapidly and precisely place a part in a machine tool. In its simplest application, a skilled machinist would set up the machine and fixture, and a less skilled individual would then load the parts and operate the tool to perform the manufacturing operation. Conventional wisdom is that precise parts require very precise fixtures and that fixtures must be made to tolerances that are significantly smaller than their respective part tolerances. Standard practice for inspection or measurement operations is that the gauge tolerance should be only ten percent of the part tolerance. To a large extent, this standard is also applied to fixtures.

There are four problem areas commonly associated with precision fixtures. These problems are cost, availability, accuracy, and error documentation. Furthermore, these problems tend to be closely interrelated. The most basic of these problems is cost. In addition to the initial cost of manufacture, there are costs of validation, maintenance, and rework. Contact points on fixtures are subject to wear, and fixture shapes must be verified periodically, with occasional rework being necessary to return them to their specified dimensions. There is also the cost of setting up an incorrectly shaped fixture or adjusting the setup to compensate for part-to-part or lot-to-lot differences.

Availability is related to cost, since all too often, extra fixtures are held in inventory in case they are needed. The manufacture of a precision fixture can be a very time-consuming operation, and in most applications, the demands of production require that one or more spare fixtures be available at all times. In the aggregate, the cost of this inventory may be significant.

The problem of accuracy can be exacerbated in some applications, for example laser drilling. A small deviation in the shape of a fixture may translate into a very large error in the location of a machined feature. In a laser drilling application, for example, the holes in the surface of a part may be formed at a large angle relative to the surface normal at the drilling point. At angles such as 70 or 80 degrees from normal, even a small error in the location of the surface will result in a large error in the location of the hole.

The documentation problem is generated by the common practice of making manual adjustments to numerically controlled (NC) tool paths or the use of mechanical shims to adjust the location of a part within a fixture. Such practices may remain undocumented, and when the process is moved to a new location or discontinued for a period of time, such undocumented adjustments may be lost, resulting in cost and quality problems when the process is later reinitiated. In cases where fixtures are shimmed or NC programs are altered, the true as-manufactured product definition may be impossible to establish.

BRIEF SUMMARY OF THE INVENTION

Thus, there is a particular need to develop a manufacturing process capable of producing precision parts without the use of precision fixtures. Accordingly, a method of performing a manufacturing operation on a part is described herein, the method including the steps of: creating a numeric model of a part; creating a numeric model of a fixture design having a plurality of contact faces for supporting the part in a design position relative to a machine tool coordinate system; creating a tool path program for controlling the operation of the machine tool in the performance of a manufacturing operation on the part in the design position; manufacturing a fixture based upon the fixture design; installing the fixture in the machine tool; measuring the location of the plurality of contact faces of the fixture; creating a numeric model of the location of the plurality of contact faces of the fixture relative to the machine tool coordinate system; nesting the model of the part into the model of the location of the plurality of contact faces; and, recording a transformation matrix describing the movement of a coordinate system of the part as it is moved during the step of nesting. The method further includes the steps of: using the transformation matrix to transform the tool path program to an as-fixtured tool path program; and using the as-fixtured tool path program to perform a manufacturing operation on a part disposed in the fixture.

DESCRIPTION OF THE DRAWINGS

The features and advantages of the present invention will become apparent from the following detailed description of the invention when read with the accompanying drawings in which.

DETAILED DESCRIPTION OF THE INVENTION

Although traditional measuring methods can be used, this invention takes advantage of the availability of inexpensive precision measurement devices such as Coordinate Measuring Machines (CMM) in combination with Computer Aided Drafting (CAD) modeling of parts. The method of this invention avoids the problems associated with precision fixtures by substituting precision measurement of relatively low cost, non-precision fixtures.

The preferred fixtures for this method have contact surfaces which are flat, spherical, cylindrical, or face intersections (edges). These fixture contact shapes are preferred because it is possible to measure them with a high degree of precision and they are simple to model numerically. This method may also be used with fixtures whose contact faces are not simple shapes, although some loss of precision may be expected due to the difficulties in modeling these surfaces from actual measurement data.

Figure 1:
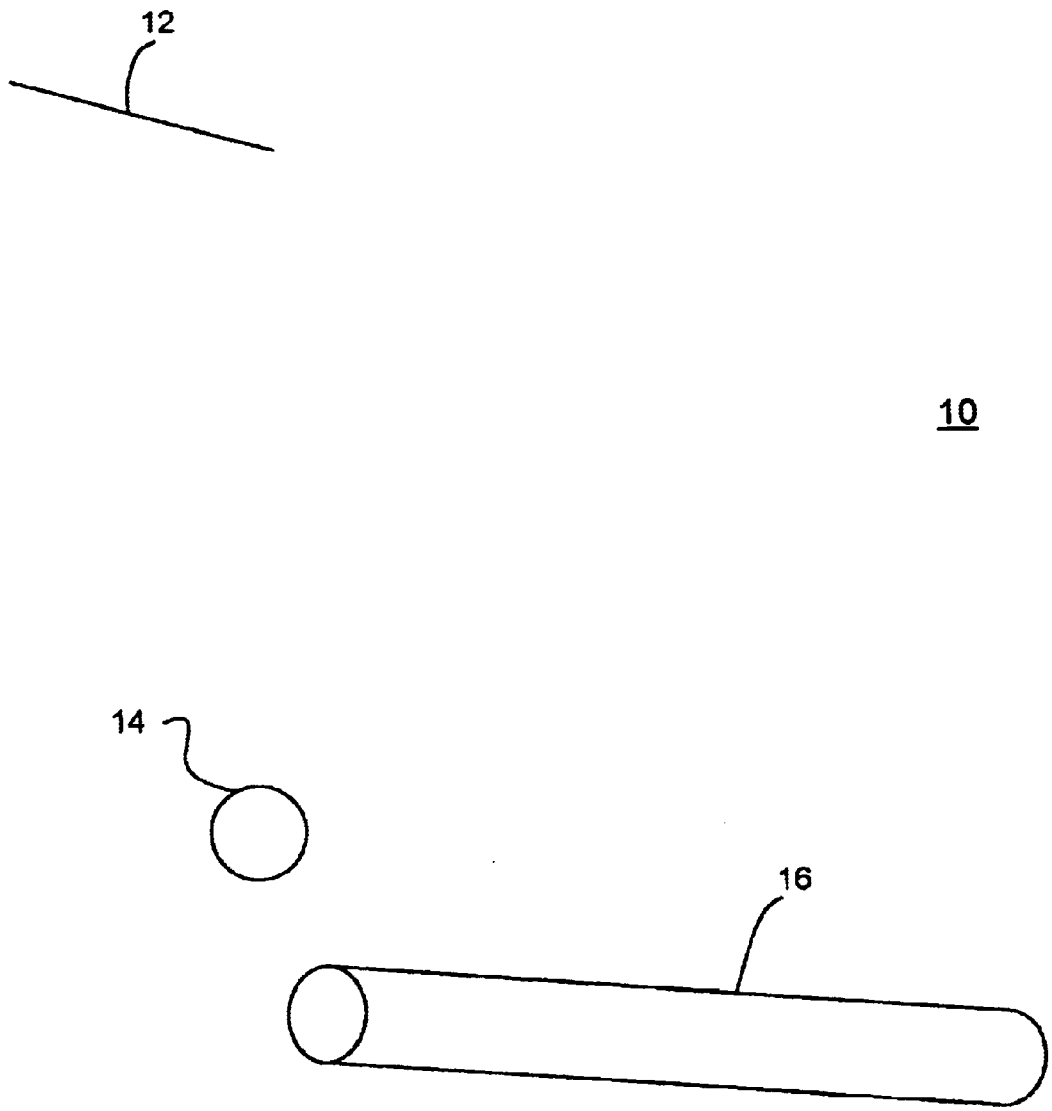
FIG. 1 illustrates the contact surfaces of a fixture.
Figure 2:
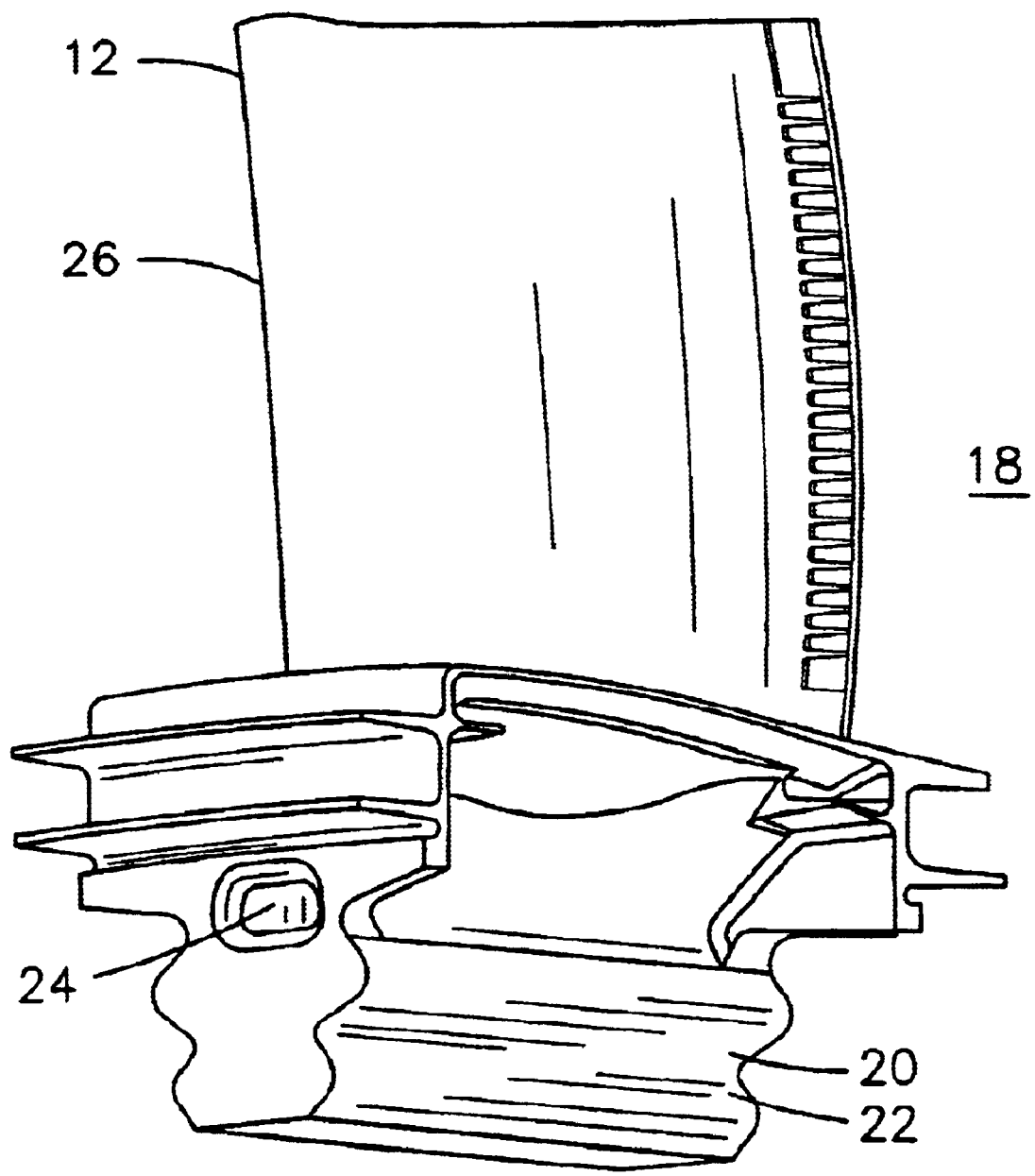
FIG. 2 illustrates a part.

FIG. 1 illustrates a fixture 10 having three significant contact surfaces. Only the contact surfaces of fixture 10 are illustrated in FIG. 1, with the remaining portions of the fixture 10 taking a shape appropriate for interfacing with a machine tool (not shown). Fixture 10 includes an edge 12, a spherical structure 14, and a cylindrical structure 16. A part which may fit into fixture 10 is depicted in FIG. 2. The part 18 in this example is a turbine blade. Note that while the fixture 10 is a collection of relatively simple contact surfaces, the part is defined by surfaces which are not so easily remodeled. These surfaces are known as free-form surfaces, and are usually contained in CAD models of the part.

Figure 3:
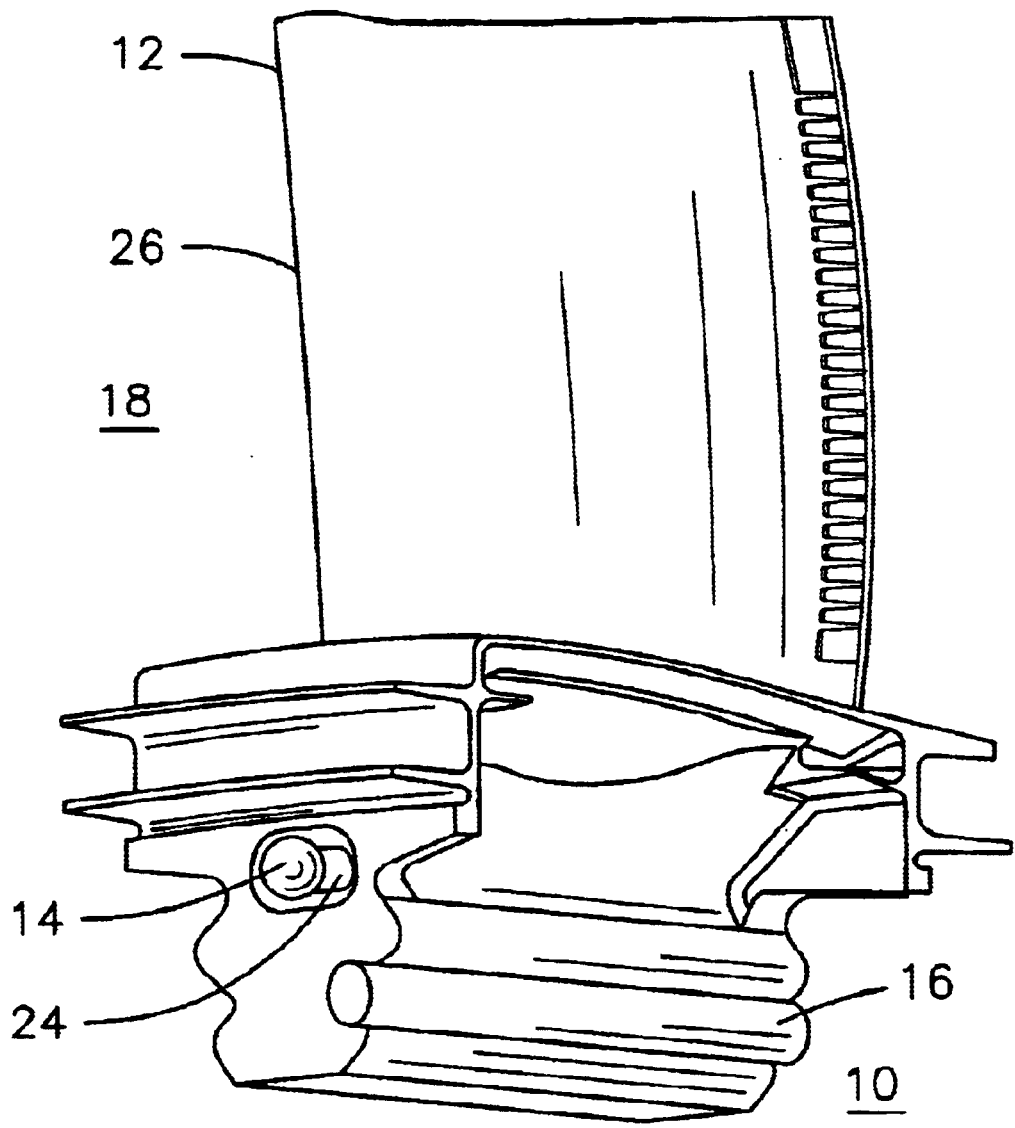
FIG. 3 illustrates the part nested against the contact surfaces of the fixture.

When a part is placed in a fixture in such a way that the part cannot move without losing contact with at least one contact surface of the fixture, the part is said to be nested in the fixture. FIG. 3 illustrates part 18 nested in fixture 10. Ideally, the nested position is a unique and unambiguous position of the part in the fixture, thus ensuring the part's correct orientation with respect to a subsequent machine operation. In this example, pin 16 of fixture 10 is in contact with flat surfaces 20 22 as may be seen on FIG. 2. Similarly, ball 14 is in point contact with flat surface 24, and edge 12 is in either point or line contact with surface 26. These contacts restrain the movement of part 18 in all six degrees of freedom with respect to any coordinate system. The method disclosed herein provides for the nesting of a CAD representation of the part 18 into a CAD representation of the fixture 10. In this manner, the CAD representation of the part 18 may then be located in a machine tool's coordinate system exactly where it will be located during a manufacturing operation. It is then possible to construct tool paths that correspond to the nested CAD representation of the part 18. By recording the transformation matrix used to nest the part representation into the fixture representation, it is possible to then apply the transformation matrix to the coordinates of any geometry associated with the CAD representation of the part to determine the alignment of that geometry as it lies nested in the fixture 10. This transformation matrix may also be applied to any tool path associated with the CAD representation of the part 18, and by doing so, causing those tool paths to align with the part 18 as it lies nested in the fixture 10. This approach is illustrated in FIG. 4.

Figure 4:
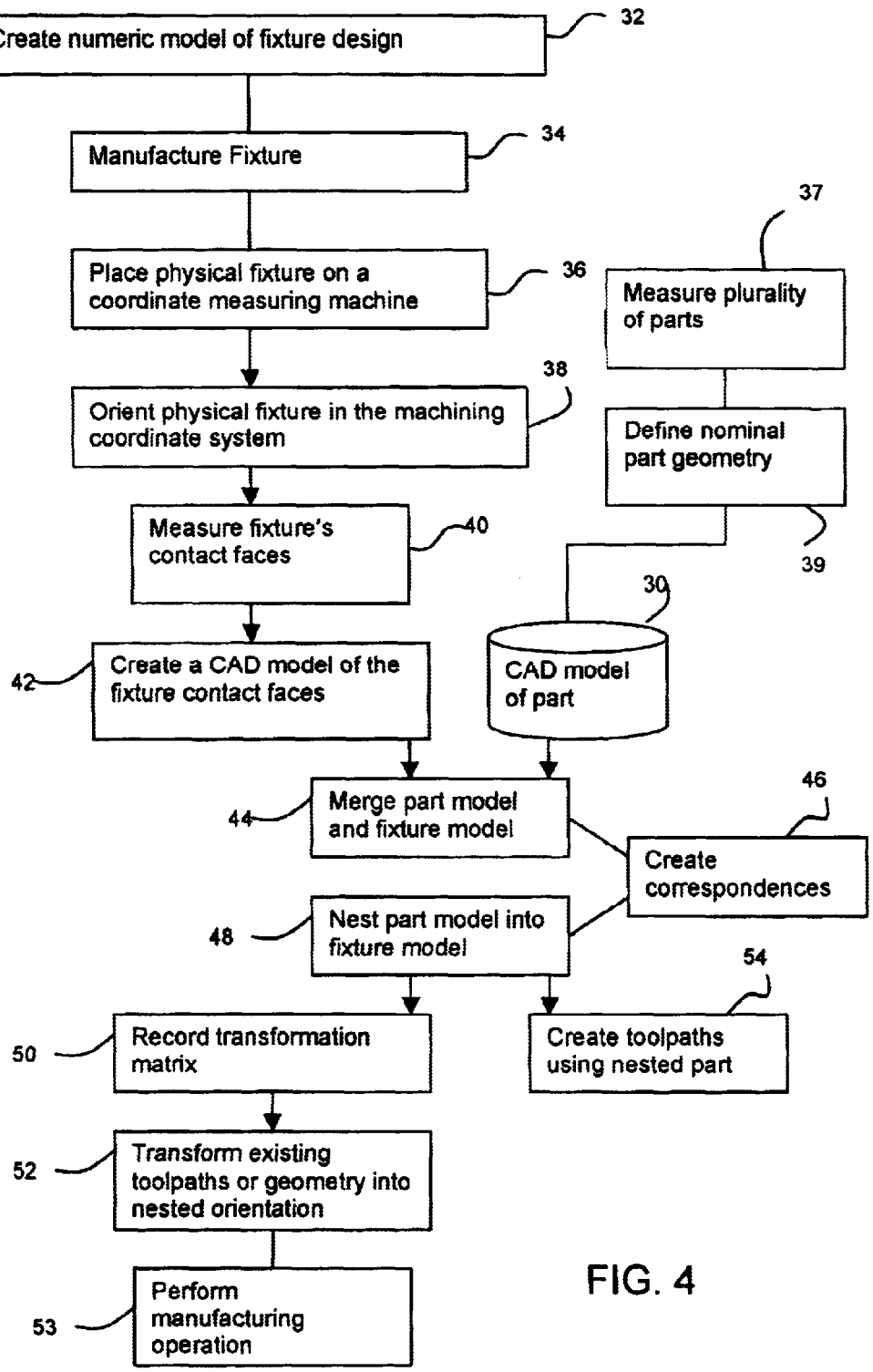
FIG. 4 illustrates the steps of a process for using a non-precision fixture to manufacture a precision part.
Figure 5:
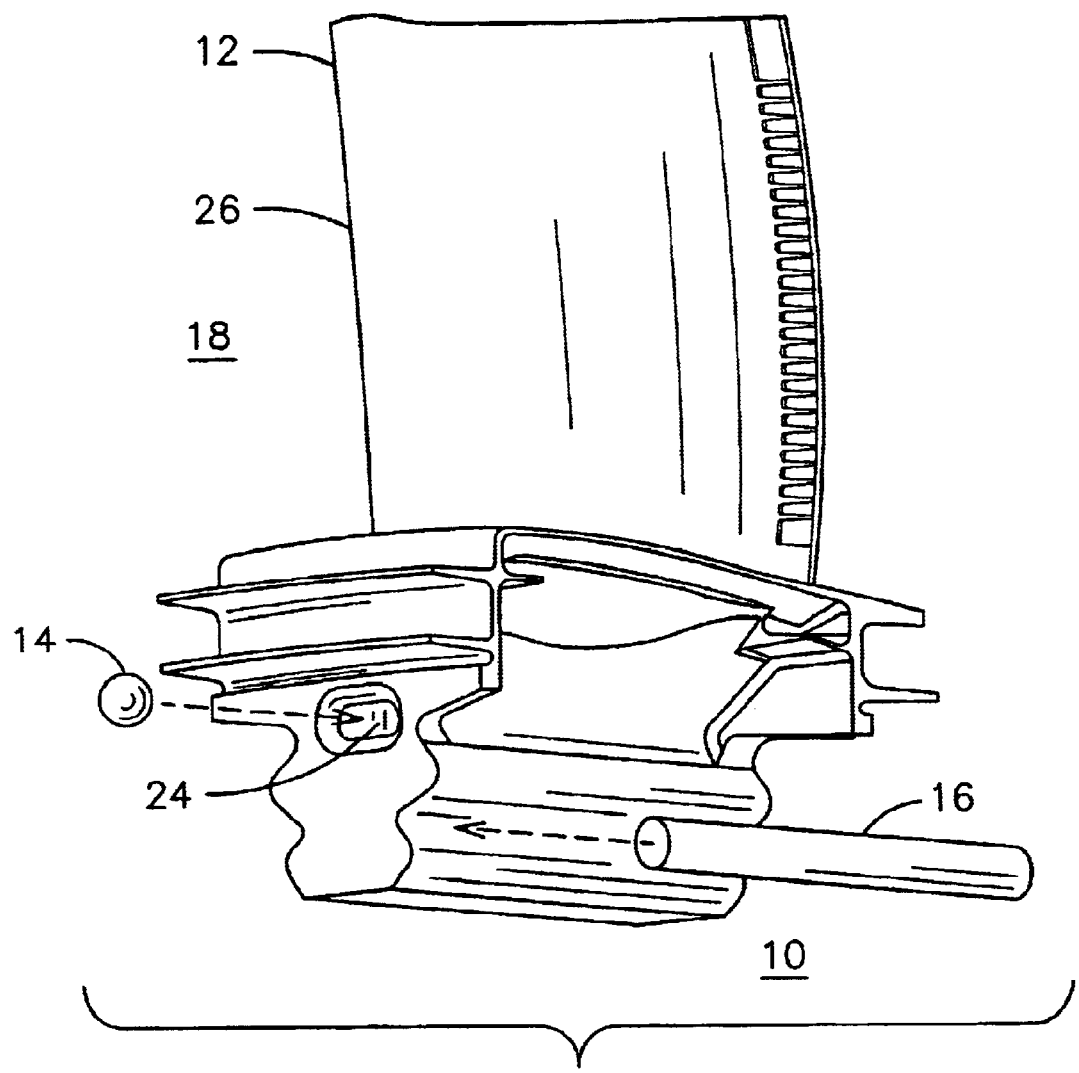
FIG. 5 illustrates a part and a fixture modeled in the same CAD model prior to being nested.

A first step 30 in the method 28 of FIG. 4 is to create a numeric model representing the part. The numeric model maybe, for example, a CAD model of a part 18 in the format of any known CAD design tool. A numeric model of a fixture design may be created at step 32 using a similar CAD tool. The fixture 10 may have a plurality of contact faces 12,14,16 for supporting the part 18 in a design position relative to a machine tool coordinate system. The fixture 10 may then be manufactured at step 34 utilizing standard manufacturing tolerances, such as may be specified for the manufacturing of the part 18. The fixture 10 may then be placed on a coordinate measuring machine at step 36 to establish a CMM coordinate system. around the Fixture 10 at step 38 to mirror the machine tool coordinates as they will exist when the fixture 10 is mounted on the NC machine tool. The size and location of the contact surfaces 12,14,16 of the fixture 10 are then measured at step 40.

A numeric model may then be created at step 42 to represent the contact surfaces 12,14,16 of the fixture 10 based upon the measurements taken at step 40. Note that models of the simple conic and flat-faced primitives can be constructed directly from the offsets of the CMM ball center data. The construction of a numeric model at step 42 may be done automatically using a library of commands such as those available with most commercial CAD systems. It is then possible at step 44 to merge the part model from step 30 and the fixture model from step 42 into the same CAD numeric model. Within this new CAD model, the modeled fixture 10 is oriented and located as it will be positioned in the machine tool and the part model remains in its as-designed location and orientation. A set of correspondences may then be created at step 46 between the models of the fixture contact surfaces 12,14,16 and the models of the part surfaces 20, 22, 24, 26 which will be in contact when the part 18 is firmly nested in the fixture 10. It is then possible at step 48 to nest the part representation into the fixture representation. The nesting process is described more fully below, but generally it simulates the actual nesting of a real part into a real fixture. As part of the nesting step 48, a transformation matrix is used to move the part representation from its initial position to its nested position. The transformation matrix may be recorded at step 50 and used at step 52 to transform an existing tool path or geometry into a nested orientation. Alternatively, tool paths may be created at step 54 for the nested part 18 directly from the nested part model. These tool paths will align the NC machine to the part as the part will be actually positioned on the tool. In this manner, precise positioning of the machine tool path is achieved without the need for a precise fixture.

Figure 6:
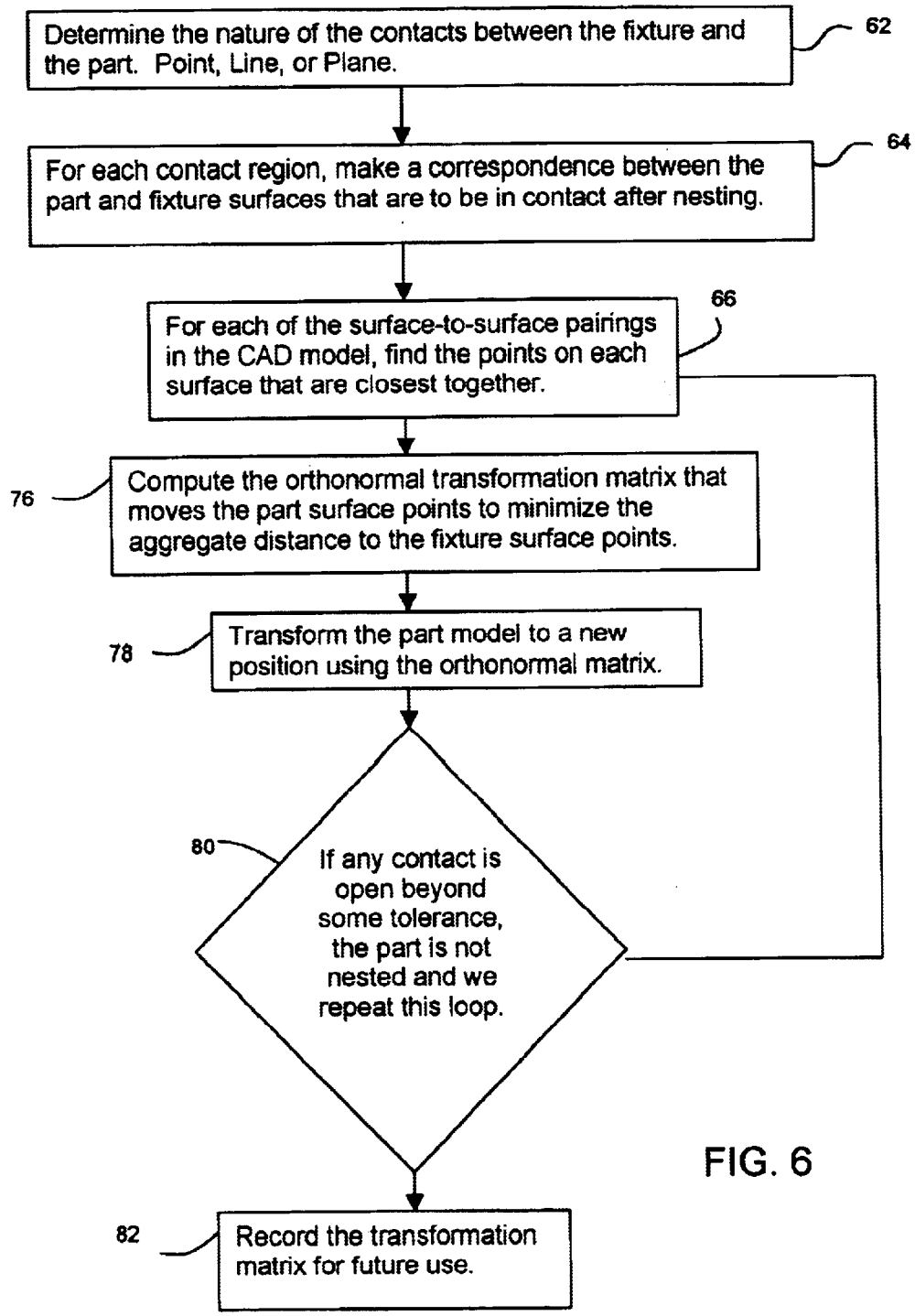
FIG. 6 illustrates the steps of a process for nesting.
Figure 7:
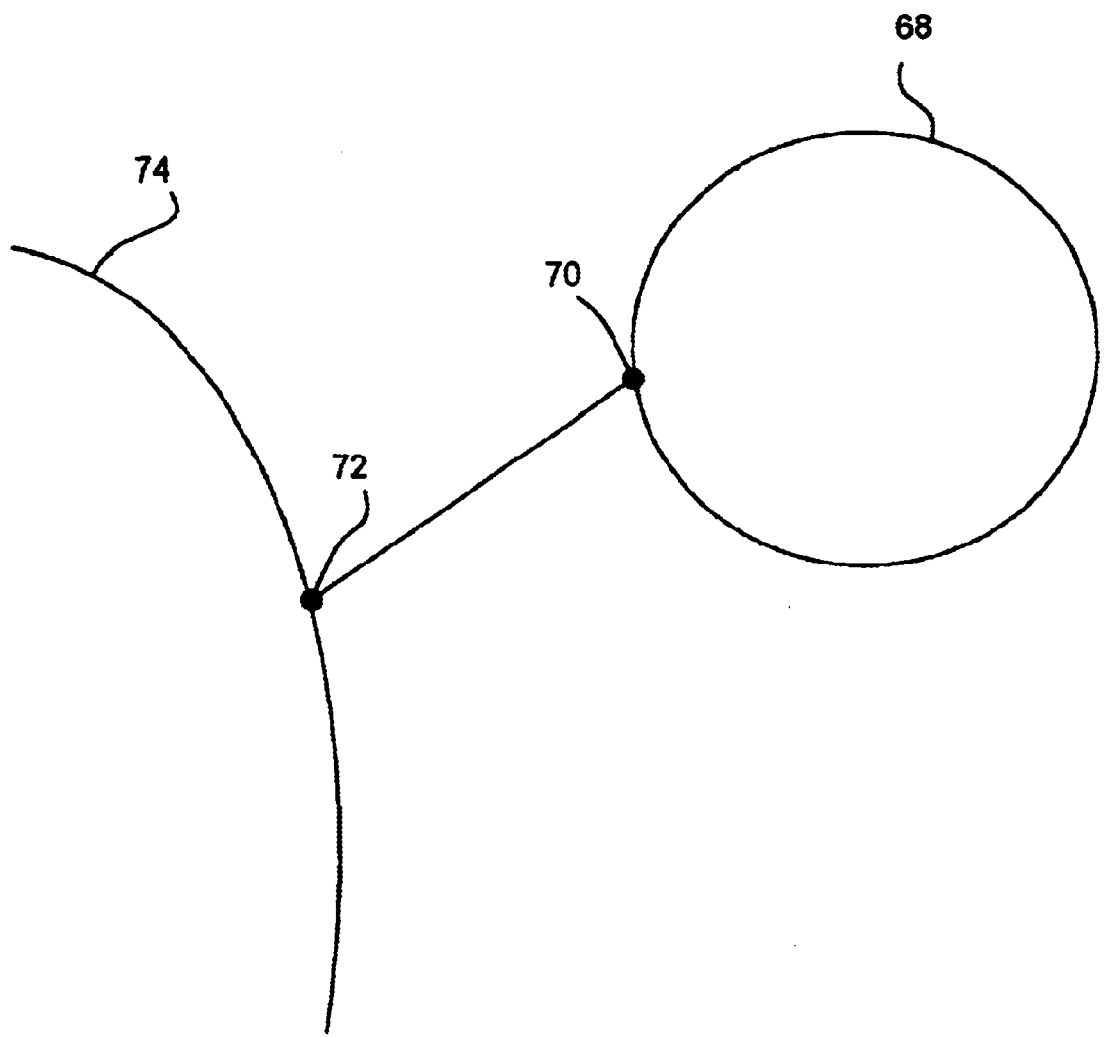
FIG. 7 illustrates the point pair on a part surface and the corresponding fixture surface.

One method of nesting the part representation into the fixture representation is illustrated in FIG. 6. The nature of the contacts between the fixture 10 and the part 18 are determined at step 62; i.e. a point, line, or plane contact. For each contact region, a correspondence is established at step 64 between the part and fixture surfaces that are to be in contact after nesting. For each of the surface-to-surface pairings in the CAD model, the points on each surface that are closest together are identified in step 66. Such a point pair is illustrated in FIG. 7 where a fixture surface 68 has a point 70 which corresponds to a point 72 on a part surface 74. Such a point pairing is computed for every expected contact between the fixture 10 and the part 18. For this set of point pairs, an orthonormal transformation matrix is computed at step 76 of FIG. 6 to move the part surface points in such a manner as to minimize the aggregate distance to the fixture surface points. The part model is then transformed by using the orthonormal transformation matrix to be in a new position at step 78. If the distance between any corresponding point pair remains beyond a predetermined value, as determined at step 80, the part is deemed to be not nested and steps 66,76,78 are repeated. If the distance between every point pairing is below the predetermined value at step 80, the transformation matrix is recorded at step 82 for further use as described above. This process simulates the actual nesting of the real part into the real fixture, and the transformation matrix represents the movement of a coordinate system of the part during the step of nesting.

One may appreciate that the final transformation matrix recorded at step 82 is the product of the several transformation matrices developed as step 76 is repeated. Accordingly, the movement of the part from a first position to a second position, such as from a design position in the machine tool to an as fixtured position in the machine tool, may be determined from the transformation matrix recorded in step 82. The movement to the nested position may therefore be determined as a function of any desired coordinate system and from any starting point within such coordinate system. In essence, the transformation matrix recorded in step 82 defines the difference between the as-designed fixture and the as-manufactured fixture. By defining these differences in terms of a transformation matrix describing the effect of such differences on the position of a nested part, a transformation matrix is obtained that allows subsequent machine tool paths to be adjusted to reflect the deviations caused by an imprecisely manufactured fixture. Thus the method described herein substitutes the need for precisely manufacturing a fixture with the capability for precisely measuring an existing fixture. Current CMM technology makes such precise measurements a relatively easy task, particularly for the above-described simple contact surface geometries, thereby decreasing the overall cost and increasing the overall accuracy of downstream manufacturing operations.

This process may further be used to account for the differences between an actual part, or a representative part from a plurality of parts, and the as-designed part. As illustrated in FIG. 4, a plurality of parts may be measured at step 37 to define a nominal part geometry at step 39. The nominal part geometry may then be used to create the numeric model of the part at step 30. From this point forward, the process of FIG. 4 proceeds as described above. By using the dimensions of the nominal part, differences between various batches of parts may be accounted for, thereby improving the accuracy of downstream processes without the need for a new precision fixture or a readjustment of an original fixture.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method of manufacturing precision parts with non-precision fixtures, the method comprising the steps of:

manufacturing a fixture having a plurality of physical contact faces for locating a part in a design position in a manufacturing tool during a manufacturing operation;

measuring the size and relative locations of the plurality of physical contact faces;

creating a numeric model representing the location of the physical contact faces relative to coordinates of the manufacturing tool;

creating a numeric model representing the part in a design location;

nesting the model of the part into the model of the location of the physical contact faces;

developing a transformation matrix describing the movement of a coordinate system of the part during the step of nesting.

2. The method of claim 1, further comprising the steps of:

developing a design tool path defining a manufacturing operation to be performed on the part when disposed in the design position;

using the transformation matrix to transform the design tool path into an as-fixtured tool path.

3. The method of claim 1, wherein the step of creating a numeric model of the part comprises creating a numeric model representing a geometric entity associated with the part, the method further comprising the step of using the transformation matrix to transform the numeric model of a geometric entity to represent the geometric entity in an as-fixtured position.

4. A method of performing a manufacturing operation on a part, the method comprising the steps of:

creating a numeric model of a part in a design location relative to a coordinate system of a machine tool;

creating a numeric model of a fixture design having a plurality of physical contact faces for supporting the part in a design position;

creating a tool path program for controlling the operation of the machine tool in the performance of a manufacturing operation on the part in the design position;

manufacturing a fixture based upon the fixture design;

installing the fixture in the machine tool;

measuring the location of the plurality of physical contact faces of the fixture relative to the coordinate system of the machine tool;

creating a numeric model of the location of the plurality of physical contact faces of the fixture relative to the machine tool coordinate system;

nesting the model of the part into the model of the location of the plurality of contact faces;

recording a transformation matrix describing the movement of a coordinate system of the part as it is moved during the step of nesting.

5. The method of claim 4, further comprising the steps of:

creating a tool path program for performing a manufacturing operation on the part in the design position;

using the transformation matrix to transform the tool path program to an as-fixtured tool path program; and using the as-fixtured tool path program to perform a manufacturing operation on a part disposed in the fixture.

6. A method of performing a manufacturing operation on a part, the method comprising the steps of:

measuring a plurality of physical parts; defining a nominal part representative of the plurality of physical parts;

creating a numeric model representing the nominal part;

creating a numeric model of a fixture design having a plurality of physical contact faces for supporting the nominal part in a design position relative to a machine tool coordinate system;

creating a tool path program for controlling the operation of the machine tool in the performance of a manufacturing operation on the nominal part in the design position;

manufacturing a fixture based upon the fixture design;

measuring the location of the plurality of physical contact faces of the fixture relative to the machine tool coordinate system;

creating a numeric model of the location of the plurality of physical contact faces of the fixture relative to the machine tool coordinate system;

nesting the model of the nominal part into the model of the location of the plurality of physical contact faces; and recording a transformation matrix describing the movement of a coordinate system of the nominal part as it is moved during the step of nesting.

7. The method of claim 6, further comprising the steps of:

using the transformation matrix to transform the tool path program to an as-fixtured tool path program; and using the as-fixtured tool path program to perform a manufacturing operation on the plurality of parts.

8. A method of manufacturing comprising the steps of:

measuring the size and location of physical contact surfaces of a fixture relative to a coordinate system of a machine tool;

creating a CAD model representation of the physical contact surfaces;

creating a CAD model representation of a part;

merging the CAD model of the physical contact surfaces and the CAD model of the part into the same CAD model wherein the physical contact surfaces are located as the fixture is positioned on the machine tool and the part is in an as-designed position;

nesting the part representation into the contact surface representation;

recording a transformation matrix describing the movement of the coordinate system of the part as it is moved during the step of nesting.

9. The method of claim 8, further comprising;

identifying a first set of points on the part and a second set of points on corresponding contact surfaces such that corresponding point pairs represent points of minimum distance between the part and the contact surface; and computing a transformation matrix that moves the part points so as to minimize the aggregate distance between the contact surface points and a set of transformed part points.

10. The method of claim 9, further comprising:

repeating the steps of identifying and computing until all the distances between points in each point pair are below a predetermined value.

11. The method of claim 9, further comprising the steps of:

creating a tool path program for performing a manufacturing operation on the part in the as-designed position;

using the transformation matrix to transform the tool path program to an as-fixtured tool path program; and using the as-fixtured tool path program to perform a manufacturing operation on a part disposed in the fixture.

* * * * *